United States Patent
Yang et al.

(10) Patent No.: US 10,527,904 B2
(45) Date of Patent: Jan. 7, 2020

(54) DISPLAY DEVICE AND APPARATUS, LIQUID METAL MATERIAL, RELATED FABRICATING MOLDS, METHODS, AND APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Hongbo Feng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 376 days.

(21) Appl. No.: 15/304,804

(22) PCT Filed: Feb. 22, 2016

(86) PCT No.: PCT/CN2016/074214
§ 371 (c)(1),
(2) Date: Oct. 17, 2016

(87) PCT Pub. No.: WO2017/024785
PCT Pub. Date: Feb. 16, 2017

(65) Prior Publication Data
US 2017/0176786 A1    Jun. 22, 2017

(30) Foreign Application Priority Data
Aug. 10, 2015 (CN) .......................... 2015 1 0488028

(51) Int. Cl.
*G02B 26/00* (2006.01)
*G02F 1/137* (2006.01)
(Continued)

(52) U.S. Cl.
CPC ............. *G02F 1/137* (2013.01); *B22D 17/08* (2013.01); *B22D 17/203* (2013.01);
(Continued)

(58) Field of Classification Search
CPC ........ G02F 1/167; G02F 2203/34; G02F 1/00; G02F 1/01; G02F 1/1333;
(Continued)

(56) References Cited

U.S. PATENT DOCUMENTS 4,420,897 A * 12/1983 Castleberry ............. G09F 9/372
345/48
5,477,358 A * 12/1995 Rosenblatt ............ G02F 1/1393
349/130

(Continued)

FOREIGN PATENT DOCUMENTS

CN   1987579 A      6/2007
CN   102854736 A    1/2013
(Continued)

OTHER PUBLICATIONS

The World Intellectual Property Organization (WIPO) International Search Report for PCT/CN2016/074214 dated May 25, 2016 p. 1-6.

*Primary Examiner* — William R Alexander
*Assistant Examiner* — Balram T Parbadia
(74) *Attorney, Agent, or Firm* — Westerman, Hattori, Daniels & Adrian, LLP (57) ABSTRACT

In accordance with some embodiments of the disclosed subject matter, a display device, a display apparatus, a liquid metal material, and related fabricating molds, methods, and apparatus are provided. In some embodiments, the disclosed
(Continued)

subject matter provides a display device, comprising: a first substrate; a second substrate; and a liquid metal materiel layer sandwiched by the first substrate and the second substrate; wherein the liquid metal materiel layer comprises: a base fluid, and a plurality of liquid metal particles dispersed in the base fluid.

4 Claims, 5 Drawing Sheets

(51) Int. Cl.
| | |
|---|---|
| G02F 1/00 | (2006.01) |
| G02F 1/01 | (2006.01) |
| B22D 17/08 | (2006.01) |
| B22D 17/20 | (2006.01) |
| B22D 17/22 | (2006.01) |
| B22D 17/32 | (2006.01) |
| B22F 1/00 | (2006.01) |
| B22F 9/08 | (2006.01) |
| G02F 1/1333 | (2006.01) |
| G02F 1/1335 | (2006.01) |
| G02F 1/1337 | (2006.01) |

(52) U.S. Cl.
CPC ..... *B22D 17/2218* (2013.01); *B22D 17/2236* (2013.01); *B22D 17/32* (2013.01); *B22F 1/0044* (2013.01); *B22F 9/08* (2013.01); *G02F 1/00* (2013.01); *G02F 1/01* (2013.01); *G02F 1/1333* (2013.01); *G02F 1/1337* (2013.01); *G02F 1/133528* (2013.01)

(58) Field of Classification Search
CPC ............. G02F 1/133377; G02F 1/1337; G02F 1/13476; G02F 1/137; G02F 1/1391; G02F 1/1393; G02F 1/1396; G02F 1/15; G02F 1/1506; G02F 1/1508; G02F 1/19; G02F 1/23; G02F 2001/133742; G09G 3/38; B22F 1/0044; G02B 26/00
See application file for complete search history.

(56) References Cited

U.S. PATENT DOCUMENTS

| | | | | |
|---|---|---|---|---|
| 5,619,352 | A | * 4/1997 | Koch | G02B 5/3016 349/117 |
| 5,986,734 | A | * 11/1999 | Winker | G02B 5/3016 349/117 |
| 8,182,720 | B2 | 5/2012 | Yu et al. | |
| 2003/0218791 | A1 | * 11/2003 | Okura | G02F 1/1506 359/267 |
| 2003/0231268 | A1 | * 12/2003 | Chen | G02F 1/133555 349/113 |
| 2006/0007529 | A1 | * 1/2006 | Mizuno | G02F 1/167 359/296 |
| 2006/0028707 | A1 | * 2/2006 | Shinozaki | G02F 1/15 359/265 |
| 2006/0240198 | A1 | * 10/2006 | Tanikawa | C08F 283/10 428/1.53 |
| 2007/0109218 | A1 | * 5/2007 | Saito | G09G 3/38 345/55 |
| 2007/0126695 | A1 | * 6/2007 | Kishi | G02F 1/167 345/107 |
| 2008/0100654 | A1 | * 5/2008 | Kitahara | B41J 2/14233 347/12 |
| 2009/0021472 | A1 | * 1/2009 | Ikeda | G02F 1/19 345/105 |
| 2012/0313129 | A1 | * 12/2012 | Zettsu | H01L 51/5048 257/98 |
| 2014/0151608 | A1 | * 6/2014 | Qi | H01B 1/04 252/503 |

FOREIGN PATENT DOCUMENTS

| | | |
|---|---|---|
| CN | 103209788 A | 7/2013 |
| CN | 104108248 A | 10/2014 |
| CN | 104118222 | 10/2014 |
| CN | 104308452 A | 1/2015 |
| CN | 104416159 A | 3/2015 |

* cited by examiner

DISPLAY DEVICE AND APPARATUS, LIQUID METAL MATERIAL, RELATED FABRICATING MOLDS, METHODS, AND APPARATUS

CROSS-REFERENCES TO RELATED APPLICATIONS

This PCT patent application is a national phase entry under 35 U.S.C. § 371 of International Application No. PCT/CN2016/074214, filed on Feb. 22, 2016, which claims priority of Chinese Patent Application No. 201510488028.9, filed on Aug. 10, 2015, The above enumerated patent applications are incorporated by reference herein in their entirety.

TECHNICAL FIELD

The disclosed subject matter generally relates to the display technologies and, more particularly, relates to a display device, a liquid metal material, related fabricating molds, methods, and apparatus.

BACKGROUND

Liquid crystal display (LCD) is a thin flat display device consisting of a number of colorful or monochrome pixels that are usually placed in front of light sources or in front of reflectors as backlight. LCD device have occupied the main display market due to many advantages, such as low power consumption, small size, large viewing area, fine display quality, etc.

However, with the development of LCD technology, the characteristics of the liquid crystal material have gradually become a bottleneck to enhance the display quality. For example, the electro-optical characteristics of the liquid crystal material may determine that a sufficiently-large bias voltage is required to achieve a rotation in the polarization direction in a LCD device, and that the fastest response time may be up to ten or tens of milliseconds. Therefore, it is very difficult to prominently improve the performances of a LCD in these areas.

Accordingly, it is desirable to provide a display device, a liquid metal material, related fabricating molds, methods, and apparatus.

BRIEF SUMMARY

In accordance with some embodiments of the disclosed subject matter, a display device, a display apparatus, a liquid metal material, and related fabricating molds, methods, and apparatus are provided.

An aspect of the present disclosure provides a display device, comprising: a first substrate; a second substrate; and a liquid metal materiel layer sandwiched by the first substrate and the second substrate; wherein the liquid metal materiel layer comprises: a base fluid, and a plurality of liquid metal particles dispersed in the base fluid.

In some embodiments, the plurality of liquid metal particles comprises rod-shaped crystal nanoparticles formed by a liquid metal.

In some embodiments, the liquid metal is selected from a group of cesium, gallium, rubidium, potassium, sodium, indium, lithium, tin, bismuth, zinc, antimony, magnesium, aluminum, mercury, and a combination thereof.

In some embodiments, the display device further comprises: a plurality of first sub-pixel areas on the first substrate; and a plurality of second sub-pixel areas on the second substrate; wherein each of the first sub-pixel areas comprises a sub-pixel driving circuit for generating an electromagnetic field to control a rotational orientation of the plurality of liquid metal particles.

In some embodiments, the display device further comprises: a plurality of color filters with at least three different colors; wherein each of the second sub-pixel areas comprises one of the color filters.

In some embodiments, the display device of further comprises: a first polarizing plate on one side of the first substrate which is opposite to the liquid metal material layer; and a second polarizing plate on one side of the second substrate which is opposite to the liquid metal material layer; wherein the first polarizing plate and the second polarizing plate have different polarizing directions.

In some embodiments, the display device further comprises: a first aligning layer between the first substrate and the liquid metal material layer; and a second aligning layer between the second substrate and the liquid metal material layer; wherein the first aligning layer and the second aligning layer are configured for presetting initial rotational orientations of the plurality of liquid metal particles.

Another aspect of the present disclosure includes a method for fabricating the disclosed display device, the method comprising: forming the first aligning layer on the first substrate, and forming the second aligning layer on the second substrate; forming the liquid metal material layer on the first aligning layer; and combining the first substrate with the second substrate to make the first aligning layer and the second aligning layer locating in between of the first substrate and the second substrate.

Another aspect of the present disclosure includes a display apparatus, comprising the disclosed display.

Another aspect of the present disclosure includes a mold for fabricating a liquid metal material, comprising: a first fluid passage inside of the mold comprising a plurality of micro-chambers interconnected with each other in a sequence, wherein each micro-chamber has a rod-like shape and nanoscale dimensions; an injection port interconnected with at least one of the plurality of micro-chambers that is at a head of the sequence; and a discharge port interconnected with at least one of the plurality of micro-chambers that is at an end of the sequence.

In some embodiments, the mold further comprises a second fluid passage for introducing a cooling fluid into the mold.

In some embodiments, the mold further comprises: a plurality of first electrodes surrounding the plurality of micro-chambers; and an electric field control signal terminal connected with the plurality of first electrodes.

In some embodiments, the mold further comprises: a plurality of magnetic field generating devices surrounding the plurality of micro-chambers; and a magnetic field control signal terminal connected with the plurality of magnetic field generating devices.

In some embodiments, the mold further comprises: a first mold substrate with a plurality of micro-concaves on a surface of the first mold substrate; and a second mold substrate with a plurality of micro-concaves on a surface of the second mold substrate; wherein the plurality of micro-chambers are enclosed by the micro-concaves on the first mold substrate and the second mold substrate.

Another aspect of the present disclosure provides a method for fabricating a liquid metal material, comprising: in a vacuum environment, injecting a liquid metal in a molten state into a first fluid passage of a mold through a pressure pipe that is connected with an injection port and a discharge port of the first fluid passage; controlling a pressure applied to the first fluid passage from the pressure pipe, to make the liquid metal fill up a plurality of micro-chambers of the first fluid passage; introducing a cooling fluid through a cooling pipe into a second fluid passage of the mold, to solidify the liquid metal into a plurality of rod-shaped nanoparticles that have crystal structures; and releasing the plurality of nanoparticles from the plurality of micro-chambers of the mold to obtain a plurality of liquid metal particles.

In some embodiments, the mold comprises a first mold substrate and a second mold substrate, wherein the plurality of micro-chambers are enclosed by a plurality of micro-concaves on a surface of the first mold substrate and a plurality of corresponding micro-concaves on a surface of the second mold substrate; and the method further comprises separating the first mold substrate and the second mold substrate, and collecting the plurality of liquid metal particles in the micro-concaves of the first mold substrate and the second mold substrate.

In some embodiments, the method further comprises presetting a surface-treating agent on interior surfaces of the plurality of micro-chambers for forming a transparent coating layer on surfaces of the plurality of liquid metal particles.

In some embodiments, the method further comprises stirring the plurality of liquid metal particles in a liquid including a dispersant and a surface-treating agent to obtain a transparent coating layer formed on surfaces of the plurality of liquid metal particles.

In some embodiments, the method further comprises mixing the plurality of liquid metal particles with a base fluid to obtain the liquid metal material.

In some embodiments, the liquid metal is selected from any one of cesium, gallium, rubidium, potassium, sodium, indium, lithium, tin, bismuth, zinc, antimony, magnesium, aluminum, mercury, and a combination thereof.

Another aspect of the present disclosure provides a method for fabricating a liquid metal material, comprising: in a vacuum environment, injecting a liquid metal in a molten state into a first fluid passage of a mold through a pressure pipe that is connected with an injection port and a discharge port of the first fluid passage; inputting a control signal to an electromagnetic field control unit of the mold to solidify the liquid metal in a plurality of micro-chambers of the first fluid passage into a plurality of rod-shaped nanoparticles that have crystal structures; and releasing the plurality of nanoparticles from the plurality of micro-chambers of the mold to obtain a plurality of liquid metal particles.

In some embodiments, the mold comprises a first mold substrate and a second mold substrate, wherein the plurality of micro-chambers are enclosed by a plurality of micro-concaves on a surface of the first mold substrate and a plurality of corresponding micro-concaves on a surface of the second mold substrate; and the method further comprises separating the first mold substrate and the second mold substrate, and collecting the plurality of liquid metal particles in the micro-concaves of the first mold substrate and the second mold substrate.

In some embodiments, the method further comprises presetting a surface-treating agent on interior surfaces of the plurality of micro-chambers for forming a transparent coating layer on surfaces of the plurality of liquid metal particles.

In some embodiments, the method further comprises stirring the plurality of liquid metal particles in a liquid including a dispersant and a surface-treating agent to obtain a transparent coating layer formed on surfaces of the plurality of liquid metal particles.

In some embodiments, the method further comprises mixing the plurality of liquid metal particles with a base fluid to obtain the liquid metal material.

In some embodiments, the liquid metal is selected from a group of cesium, gallium, rubidium, potassium, sodium, indium, lithium, tin, bismuth, zinc, antimony, magnesium, aluminum, mercury, and a combination thereof.

Another aspect of the present disclosure provides an apparatus for fabricating a liquid metal material, comprising: an injecting unit for injecting a molten liquid metal through a pressure pipe into a first fluid passage of a mold in a vacuum environment, wherein the first fluid passage comprises: a plurality micro-chambers that are interconnected with each other in a sequence, wherein each micro-chamber has a rod-like shape and nanoscale dimensions; an injection port interconnected with at least one of the plurality of micro-chambers at a head of the sequence, and a discharge port interconnected with at least one of the plurality of micro-chambers at an end of the sequence; a cooling unit for introducing a cooling fluid through a cooling pipe into a second fluid passage of the mold to solidify the liquid metal into a plurality of rod-shaped nanoparticles that have crystal structures; and a releasing unit for releasing the plurality of nanoparticles from the plurality of micro-chambers of the mold to obtain a plurality of liquid metal particles.

In some embodiments, the mold comprises a first mold substrate and a second mold substrate, wherein the plurality of micro-chambers are enclosed by a plurality of micro-concaves on a surface of the first mold substrate and a plurality of corresponding micro-concaves on a surface of the second mold substrate; and the releasing unit comprises: a separating module for separating the first mold substrate and the second mold substrate, and a collecting module for collecting the plurality of liquid metal particles in the plurality micro-concaves of the first mold substrate and the plurality of corresponding micro-concaves of the second mold substrate.

In some embodiments, the mold further comprises a surface-treating unit for presetting a surface-treating agent on interior surfaces of the plurality of micro-chambers for forming a transparent coating layer on surfaces of the plurality of liquid metal particles.

In some embodiments, the mold further comprises a stirring unit for stirring the plurality of liquid metal particles in a liquid including a dispersant and a surface-treating agent to obtain a transparent coating layer formed on surfaces of the plurality of liquid metal particles.

In some embodiments, the mold further comprises a mixing unit for mixing the plurality of liquid metal particles with a base fluid to obtain the liquid metal material.

In some embodiments, the liquid metal is selected from any one of cesium, gallium, rubidium, potassium, sodium, indium, lithium, tin, bismuth, zinc, antimony, magnesium, aluminum, mercury, and a combination thereof.

Another aspect of the present disclosure provides an apparatus for fabricating a liquid metal material, comprising: an injecting unit for injecting a molten liquid metal through a pressure pipe into a first fluid passage of a mold in a vacuum environment, wherein the first fluid passage comprises: a plurality of micro-chambers that are interconnected with each other in a sequence, wherein each micro-chamber has a rod-like shape and nanoscale dimensions; an injection port interconnected with at least one of the plurality of micro-chambers at a head of the sequence, and a discharge port interconnected with at least one of the plurality of micro-chambers at an end of the sequence; a controlling unit for inputting a control signal to an electric or magnetic field control unit of the mold to solidify the liquid metal in a plurality of micro-chambers of the first fluid passage into a plurality of rod-shaped nanoparticles that have crystal structures; and a releasing unit for releasing the plurality of nanoparticles from the plurality of micro-chambers of the mold to obtain a plurality of liquid metal particles.

In some embodiments, the mold comprises a first mold substrate and a second mold substrate, wherein the plurality of micro-chambers are enclosed by a plurality of micro-concaves on a surface of the first mold substrate and a plurality of corresponding micro-concaves on a surface of the second mold substrate; and the releasing unit comprises: a separating module for separating the first mold substrate and the second mold substrate, and a collecting module for collecting the plurality of liquid metal particles in the plurality micro-concaves of the first mold substrate and the plurality of corresponding micro-concaves of the second mold substrate.

In some embodiments, the mold further comprises a surface-treating unit for presetting a surface-treating agent on interior surfaces of the plurality of micro-chambers for forming a transparent coating layer on surfaces of the plurality of liquid metal particles.

In some embodiments, the mold further comprises a stirring unit for stirring the plurality of liquid metal particles in a liquid including a dispersant and a surface-treating agent to obtain a transparent coating layer formed on surfaces of the plurality of liquid metal particles.

In some embodiments, the mold further comprises a mixing unit for mixing the plurality of liquid metal particles with a base fluid to obtain the liquid metal material.

In some embodiments, the liquid metal is selected from any one of cesium, gallium, rubidium, potassium, sodium, indium, lithium, tin, bismuth, zinc, antimony, magnesium, aluminum, mercury, and a combination thereof.

Another aspect of the present disclosure provides a liquid metal material obtained from the disclosed method.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a display device and a display apparatus, a liquid metal material, and related fabricating molds, methods, and apparatus.

Figure 1A:
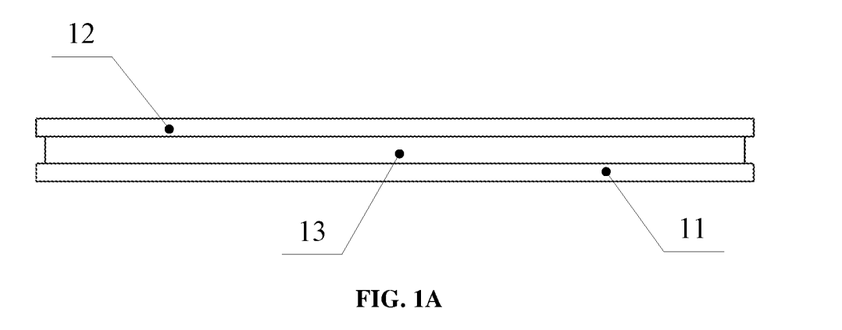
FIG. 1A is a front view structural diagram of a display device in accordance with some embodiments of the disclosed subject matter.
Figure 1B:
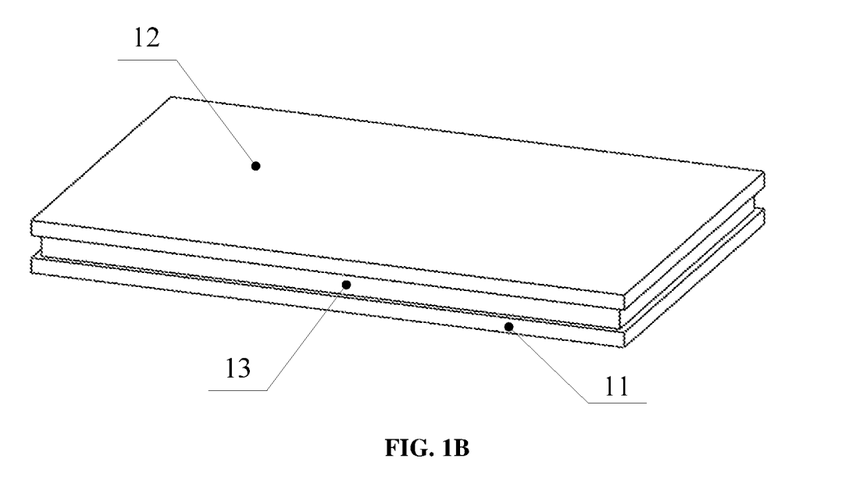
FIG. 1B is a top view structural diagram of the display device in accordance with some embodiments of the disclosed subject matter.
Figure 1C:
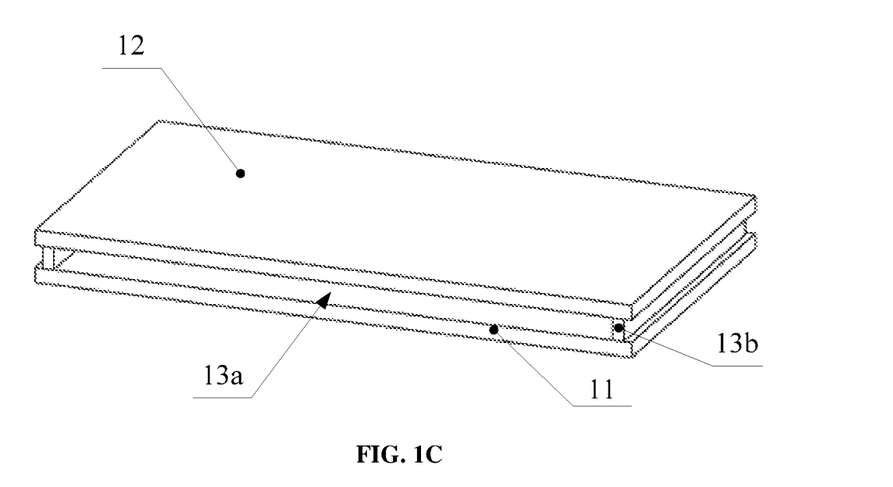
FIG. 1C is a top cross-sectional view structural diagram of the display device in accordance with some embodiments of the disclosed subject matter.

FIGS. 1A, 1B, and 1C show structural diagrams of a disclosed display device in a front view, a top view, and a top cross-sectional view respectively. As illustrated, the display device can include first substrate 11, second substrate 12, and liquid metal material layer 13.

Liquid metal material layer 13 is between first substrate 11 and second substrate 12. Referring to FIG. 1C, liquid metal material layer 13 can include liquid metal material 13a and sealing glue 13b.

Sealing glue 13b can be used for enclosing the liquid metal material 13a in a space between the first substrate 11 and the second substrate 12, and encapsulating the space. Referring to some assembling processes or encapsulation processes of LCD devices, in some embodiments, any other suitable structure can be used to replace sealing glue 13b for encapsulating or packing the space between the first substrate 11 and the second substrate 12.

Liquid metal material 13a can be filled in the space between the first substrate 11 and the second substrate 12. In some embodiments, the liquid metal material 13a can include a base fluid and liquid metal particles dispersed in the base fluid. The liquid metal particles can be liquid metal nanoparticles having a crystal structure and a rod-like shape. The base fluid is used for providing a fluid environment to disperse the liquid metal particles in the base fluid.

It should be noted that, the term "liquid metal" used herein is a general name of a type of metal material that has a melting point lower than a predetermined value (e.g., a room temperature). The state of metal material is not limited to a liquid state, it can also be a solid state, a gas state, and any other substances states. For example, satisfying the above condition that a melting point is lower than a predetermined value, the liquid metal may be selected from cesium, gallium, rubidium, potassium, sodium, indium, lithium, tin, bismuth, zinc, antimony, magnesium, aluminum, mercury, any suitable alloys of the elements thereof, and any suitable combinations thereof.

It should be understood that the liquid metal particles include crystal nanoparticles formed by a liquid metal. Since each liquid metal particle has a rod-like shape, it is a nanocrystal having a major axis and a minor axis. So the liquid metal particles have similar optical properties of the liquid crystal.

It should also be understood that, since the base fluid is used for providing a fluid environment to disperse the liquid metal particles, the base fluid should have some physical properties that correspond to the physical properties of the liquid metal particles. The base fluid can be selected from any suitable liquid materials that do not chemically react with the liquid metal particles, such as propylene glycol methyl ether acetate (PMA), glycol ether acetate, n-butanol, methyl ethyl ketone, etc.

Thus, based on the physical properties of the liquid metal, the liquid metal particles in the fluid environment can easily achieve high-speed spin motion under controls of an electric and/or magnetic field, and induce vortex pairs in the surrounding fluid to spin rapidly.

By appropriately setting electrodes and fluid passages in a display device, a movement pattern of the liquid metal particles can be confined to a single-directional quick movement, which can realize a single-directional deflection under controls of the electric and/or magnetic field.

Comparing to using an electric field to control the rotational orientation of the liquid crystal, the liquid metal particles, as a type of nanocrystals, can be controlled by a substantially same method, but using an electric filed with different strength.

Thus, in some embodiments, the liquid metal particles are nanocrystals. Each nanocrystal has a major axis and a minor axis. The liquid metal particles have similar optical characteristics of the liquid crystal, and can be single-directional deflected under an electric and/or magnetic field. So the liquid metal material is an alternative material of the liquid crystal material in a display device.

Further, comparing to the liquid crystal material, the liquid metal material can achieve high-speed movement in a relatively weak electric field. Therefore, a display device using the liquid metal material can have many unprecedented excellent characteristics, such as low power consumption, high response speed, and so on.

It should also be understood that, since the liquid metal material can replace the liquid crystal material in a display device, with reference to the structure of a conventional LCD device, a display device in accordance with some embodiments of the disclosed subject matter can have any other suitable parts that are not mentioned above.

In some embodiments, multiple sub-pixel areas can be set on first substrate 11, and multiple corresponding sub-pixel areas can be set on second substrate 12. Each of the sub-pixel area on first substrate 11 can have a sub-pixel driving circuit for generating an electric and/or magnetic field to control the rotational orientation of the liquid metal particles.

In some embodiments, on first substrate 11, multiple scanning lines can be arranged in rows, and multiple date lines can be arranged in columns. The multiple scanning lines and the multiple data lines cross with each other and line out multiple sub-pixel areas on first substrate 11.

In some embodiments, a gate metal layer, a gate insulating layer, an active layer, a source-drain metal layer, a passivation layer, a pixel electrode layer and a planarization layer, and any other suitable pattern can be formed on first substrate 11. So a sub-pixel driving circuit including a pixel electrode and at least one thin film transistor can be formed in a sub-pixel area.

The sub-pixel driving circuit can be used for supplying a driving voltage to the pixel electrode. Each sub-pixel driving circuit can be connected with a data driver beside first substrate 11 via a date line, and can be connected with a gate driver beside first substrate 11 via a scanning line.

In some embodiments, multiple sub-pixel areas can be formed on second substrate 12 that correspond to multiple sub-pixel areas on first substrate 11 respectively. Each sub-pixel area on second substrate 12 can include a common electrode that correspond to a pixel electrode of one corresponding sub-pixel area on first substrate 11.

In some embodiments, based on twisted nematic liquid crystal display (TN-LCD) drive control principle, an electric filed in liquid metal material layer 13 can be generated and a corresponding display function control can be realized by controlling a voltage between the pixel electrode and the common electrode.

In some other embodiments, based on advanced super dimension switching liquid crystal display (ADSDS-LCD) device control principle, the multiple pixel electrodes and the multiple common electrodes can be formed on a same side of the liquid metal material layer 13. For example, the multiple pixel electrodes and the multiple common electrodes can be formed on the first substrate 11.

In some other embodiments, the sub-pixel electrode driving circuit can include a conducting electrode driven by an alternating current. The conducting electrode can provide an electromagnetic field to liquid metal material layer 13.

In some other embodiments, the sub-pixel electrode driving circuit can include any suitable electric field generating device and/or magnetic field generating device to achieve a deflection control of the liquid metal particles. Besides, the sub-pixel electrode driving circuit can also include any other necessary components, such as thin film transistors, capacitors, conducting lines, etc. A detailed structure can be referred to a pixel circuit structure on an array substrate of a conventional LCD. It should be noted that any of the above described manner can be implemented for the rotational orientation control of the liquid metal particles in a display device.

In order to achieve a light-transmitting display of the above described liquid metal material layer 13, one or more polarizing plates can be set. In some embodiments, first polarizing plate 14 can be set on one side of first substrate 11 which is opposite to liquid metal material 13a, while second polarizing plate 15 can be set on one side of second substrate 12 which is opposite to liquid metal material 13a. First polarizing plate 14 and second polarizing plate 15 have different polarizing directions.

In some embodiments, under an appropriate control of an electric and/or magnetic field, the liquid metal material 13a can make the polarization direction of the incident light to deflect a certain angle. When the deflected angle equals to the difference between the polarizing direction of first polarizing plate 14 and the polarizing direction of second polarizing plate 15, the incident light can transmit the two polarizing plates.

Figure 2:
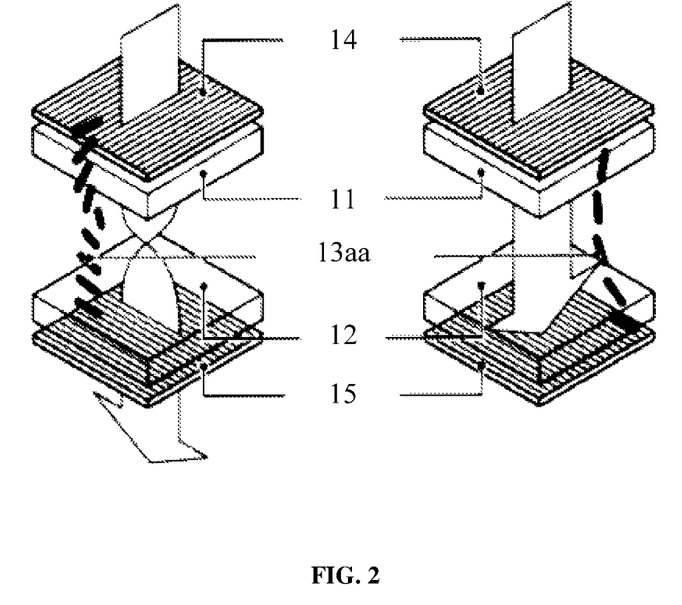
FIG. 2 is a schematic structural diagram of a display device in accordance with some embodiments of the disclosed subject matter.

Turning to FIG. 2, a schematic structural diagram of a disclosed display device is shown in accordance with some embodiments of the disclosed subject matter. As illustrated, an angle between the polarizing direction of first polarizing plate 14 and the polarizing direction of second polarizing plate 15 is approximately 90°. Liquid metal particles 13aa in liquid metal material layer 13 can have two different rotational orientation alignment states which are shown respectively in the left side and the right side of FIG. 2.

Normally, liquid metal particles 13aa in liquid metal material layer 13 have a rotational orientation alignment state as shown in the right side of FIG. 2, which does change the polarization direction of the transmitted light. So that liquid metal material layer 13 has a low transmitting rate of the incident light because of the extinction effect of first polarizing plate 14 and second polarizing plate 15.

Under a control of a suitable electric and/or magnetic field, liquid metal particles 13aa in liquid metal material layer 13 can have a rotational orientation alignment state as shown in the left side of FIG. 2, which can change the polarization direction of the transmitted light. So that liquid metal material layer 13 can have a high transmitting rate of the incident light to transmit first polarizing plate 14 and second polarizing plate 15. Based on that, in each sub-pixel area of the display device, a specific control electromagnetic field can be set in accordance with a color of a color film of the sub-pixel area, and a full picture display can be realized on the display device.

Figure 3:
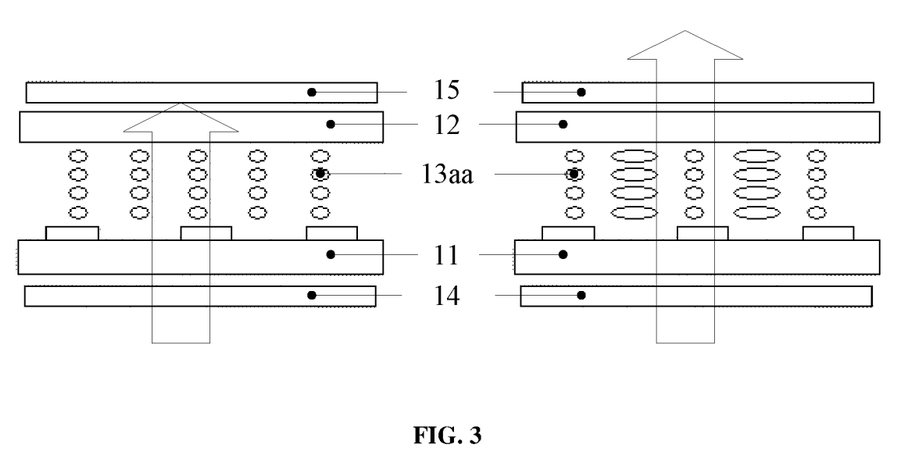
FIG. 3 is a schematic structural diagram of a display device in accordance with some other embodiments of the disclosed subject matter.

Turning to FIG. 3, a schematic structural diagram of a display device is shown in accordance with some other embodiments of the disclosed subject matter. As illustrated, first substrate 11 can include multiple block-shaped first electrodes and multiple plate-shaped second electrodes. A planar electric field can be formed between the multiple first electrodes and multiple second electrodes. The planar electric field can make liquid metal particles 13aa in liquid metal material layer 13 to have a rotational orientation alignment state as shown in the right side of FIG. 3. So that, if a suitable planar electric field is applied, liquid metal material layer 13 can have a high transmitting rate of the incident light to transmit first polarizing plate 14 and second polarizing plate 15.

Conversely, as illustrated in the left side of FIG. 3, if there is no such planar electric field, with the angle between the polarizing direction of first polarizing plate 14 and the polarizing direction of second polarizing plate 15, liquid metal material layer 13 has a low transmitting rate of the incident light because of the extinction effect of first polarizing plate 14 and second polarizing plate 15.

Based on that, in each sub-pixel area of the display device, a specific control planar electric field can be set in accordance with a color of a color film (not shown in the drawings) of the sub-pixel area, and a full picture display can be realized on the display device.

According to the principle shown in FIGS. 2 and 3, in some embodiments, the disclosed display device can further include a backlight source, which is not shown in the drawings. The backlight source can be positioned beside of first substrate 11 or second substrate 12 for providing a backlighting (e.g., the wide arrows shown in FIGS. 2 and 3). In some other embodiment, if a whole light transmittance of a disclosed display device is large enough, a backlight source can be omitted and a natural light can be used to provide a direct backlighting.

According to the principle shown in FIGS. 2 and 3, in some embodiments, liquid metal particles 13aa filling in liquid metal material layer 13 can have a preset rotational orientation state. For example, first substrate 11 can include a first aligning layer (not shown in the drawings) contacting with liquid metal material layer 13, while second substrate 12 can include a second aligning layer (not shown in the drawings) contacting with liquid metal material layer 13. The first aligning layer and the second aligning layer can be used for presetting initial rotational orientations of the liquid metal particles 13aa filling in liquid metal material layer 13. The first aligning layer and the second aligning layer can be formed by a frictional aligning process, which has similar implementations in a conventional LCD manufacturing process.

Further, in order to achieve a colorful display, a color film (not shown in the drawings) can be formed in each sub-pixel area in second substrate 12. Multiple color filters can have at least three colors, such as red, green, and blue as a set, or red, green, blue, and white as a set. The multiple color filters with different colors can be arranged alternately in the multiple sub-pixel areas on second substrate 12. In some embodiments, a color film can include a color filter with different colors. The color filter can be arranged on second substrate 12 in a way that is similar to an arrangement of a color filter substrate in a conventional LCD display device.

Figure 4:
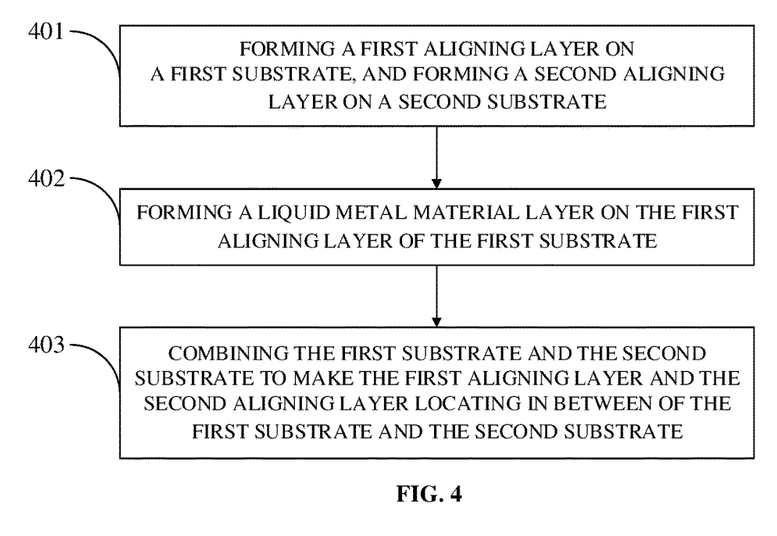
FIG. 4 shows an exemplary method for fabricating a display device in accordance with some embodiments of the disclosed subject matter.

Turning to FIG. 4, an exemplary method for fabricating a display device is shown in accordance with some embodiments of the disclosed subject matter.

Step 401: forming a first aligning layer on a first substrate, and forming a second aligning layer on a second substrate.

Step 402: forming a liquid metal material layer on the first aligning layer of the first substrate.

Step 403: combining the first substrate and the second substrate to make the first aligning layer and the second aligning layer locating in between of the first substrate and the second substrate.

In some embodiments, step 401 can be realized by a technical process including a frictional aligning process, step 402 can be realized by technical process including a instillation process, and step 403 can be realized by technical process including an assembling process and/or an encapsulation process. It should be understood that, the above noted processes are conventional processes used in conventional LCD device manufacturing processes. In order to meet some specific requirements for fabricating the disclosed display device, the processes can be adjusted in any suitable way in accordance with the characteristics of the liquid metal material in the disclosed subject matter In accordance with some embodiments of the disclosed matter, a display apparatus is provided. The display apparatus can include any of the above disclosed display device. Specifically, the display device can be: a display panel, an electronic paper, a mobile phone, a tablet computer, a television, a notebook computer, a digital picture frame, a navigation system, and any other suitable product or component having a display function. Likewise, in accordance with some embodiments of the disclosed matter, a liquid crystal material can be replace by a disclosed liquid metal material in the display apparatus. The display apparatus can have unprecedented excellent characteristics, such as low power consumption, high response speed, and so on.

Another aspect of the disclosed matter provide a mold for fabricating the disclosed liquid metal material. In some embodiments, there are multiple micro-chambers in the interior of the mold. The multiple micro-chambers can be interconnected with each other in a sequence. Each micro-chamber can be a rod-shaped and nanoscale dimensioned micro-cavity.

There are an injection port and at least one discharge port on the outer surface of the mold. The injection port can be interconnected with a micro-chamber at the head of the sequence, and the at least one discharge port can be interconnected with a micro-chamber at the end of the sequence. Therefore, a first fluid passage can be formed for introducing the liquid metal.

It should be understood that, molten liquid metal can be solidified in the multiple micro-chambers to form multiple solid particles that have shapes corresponding to the internal shapes of the multiple micro-chambers. Therefore, by appropriate setting the internal shapes and/or sized of the multiple micro-chambers, the shapes and sizes of the prepared liquid metal particles can be predetermined.

It should also be understood that, the multiple micro-chambers in the mold can have nanoscale dimensions, and can be produced by Micro Electro Mechanical Systems (MEMS). Specifically, building on micro/nano technology, MEMS can include designing, processing, manufacturing, measuring, and controlling of micro/nano materials. For example, the disclosed mold can be formed to include at least one hollow nanotube, and multiple interconnected rod-shaped micro-chambers along the nanotube by a nano-processing in the MEMS techniques.

In some embodiments, the mold can include a first mold substrate and a second mold substrate. The first mold substrate and the second mold substrate can be mirror symmetric with each other. Specifically, both the first mold substrate and the second mold substrate can include multiple corresponding micro-concaves. A pair of corresponding micro-concaves on the first mold substrate and the second mold substrate can form a micro-chamber in the mold.

In some embodiments, the multiple micro-concaves, the injection ports and discharge ports on the first mold substrate and the second mold substrate can be formed by a surface micromachining in the MEMS techniques. For example, a patterning process can be used to form desired patterns on surfaces of the first mold substrate and the second mold substrate accurately.

The internal structure of the mold can be formed by assembling a pair of first mold substrate and second mold substrate that have symmetric patterns of micro-concaves. This method can not only have a lower production cost, but also facilitate to release the mold after the formation of the liquid metal particles. As a particular example, the mold can include two quartz mold substrates fabricated by using silicon micromachining techniques. Specifically, an etching process can use potassium hydroxide\isopropyl alcohol\water (KOH\IPA\H$_2$O) as an silicon etching solution.

Figure 5:
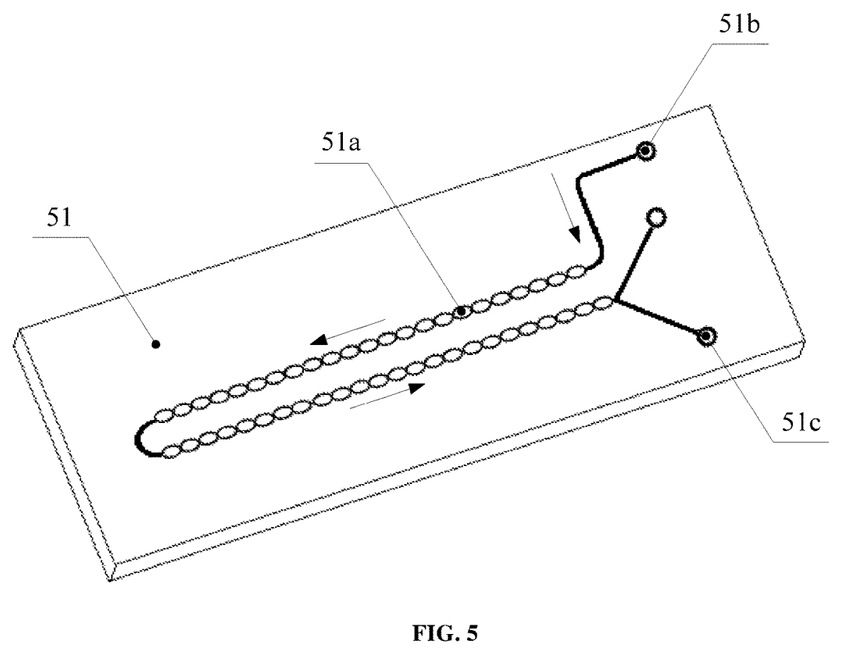
FIG. 5 is a cross-sectional view of a schematic microstructure of a mold in accordance with some embodiments of the disclosed subject matter.

As an example, FIG. 5 shows a cross-sectional view of a schematic microstructure of a mold in accordance with some embodiments of the disclosed subject matter. As illustrated, mold 51 can include multiple micro-chambers 51a that interconnected with each other in a sequence. Each micro-chamber 51a is a rod-shaper micro-cavity and has a nanoscale dimensions. For example, a micro-chamber can have a length of 10 mm to 300 mm, and have a cross-sectional width of 0.5 nm to 10 nm.

In addition, mold 51 can include injection port 51b, and two discharge ports 51c. Injection hole 51b can be used for interconnecting the outer surface of the mold with a micro-chamber at the head of the sequence, and two discharge ports 51c can be used for interconnecting a micro-chamber at the end of the sequence with the outer surface of the mold. Therefore, multiple micro-chambers 51a, injection port 51b, and two discharge ports 51c can form a first fluid passage.

Along a direction of an arrow shown in FIG. 5, the liquid metal in a molten state can be injected into the first fluid passage of mold 51. The molten liquid metal can be solidified in mold 51 to form multiple solid particles in the interior of each micro-cavity 51a.

In some embodiments, FIG. 5 illustrates a first mold substrate or a second mold substrate of mold 51. A pattern including multiple micro-concaves can be shows on positions of 51a. The first mold substrate and its corresponding second mold substrate can be assembled to form mold 51.

It should be understood that, a controlled external temperature field may be needed during the solidifying process of the liquid metal particles in the multiple micro-chambers. Therefore, the disclosed mold can also include a second fluid passage (not shown in the drawings) for cooling the fluid going through the first fluid passage. The second fluid passage can have any suitable shape and size in accordance with the desired temperature. So that, a circulating cooling fluid that goes through the second fluid passage can be used for control the temperature field of the multiple micro-chambers.

Further, the disclosed mold can include electric and/or magnetic field generating devices for improving the uniformity of the prepared liquid metal material. For example, multiple first electrodes (not shown in the drawings) can be set around the multiple micro-chambers. The multiple first electrodes can be connected to an electric field control signal terminal. As another example, multiple magnetic field generating devices (not shown in the drawings) can be set around the multiple micro-chambers. The multiple magnetic field generating devices can be connected to a magnetic field control signal terminal. Therefore, the generated electrical field or magnetic field can be used to improving the uniformity of the prepared liquid metal material. In some embodiments, the multiple first electrodes can be connected to an alternating current source, and the generated electromagnetic field can be used to improving the uniformity of the prepared liquid metal material.

Figure 6:
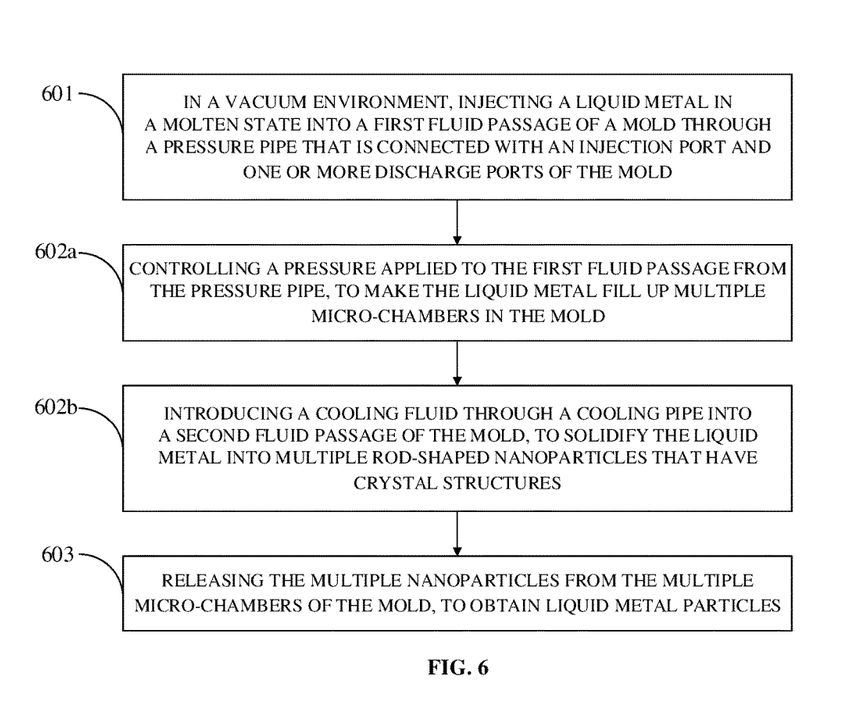
FIG. 6 shows an exemplary method for fabricating a liquid metal material in accordance with some embodiments of the disclosed subject matter.

Based on the disclosed mold, a method for fabricating a disclosed liquid metal material can be provided in accordance with some embodiments of the disclosed subject matter. In FIG. 6, an exemplary method for fabricating the disclosed liquid metal material is shown.

Step 601: in a vacuum environment, injecting a liquid metal in a molten state into a first fluid passage of a mold through a pressure pipe that is connected with an injection port and one or more discharge ports of the mold.

Step 602a: controlling a pressure applied to the first fluid passage from the pressure pipe, to make the liquid metal fill up multiple micro-chambers in the mold.

Step 602b: introducing a cooling fluid through a cooling pipe into a second fluid passage of the mold, to solidify the liquid metal into multiple rod-shaped nanoparticles that have crystal structures.

Step 603: releasing the multiple nanoparticles from the multiple micro-chambers of the mold, to obtain liquid metal particles.

It should be understood that, the vacuum environment can be provided in a vacuum chamber in a vacuum device, and the pressure pipe can pass through the chamber wall of the vacuum chamber to connect with the injection port and the one or more discharge ports of the mold.

It should be noted that, the cooling fluid flowing through the second fluid passage can constantly take away exuded heat from the multiple micro-chambers, and thus generally, a temperature of the multiple micro-chambers can be decreased over time. Since the liquid metal usually has a natural characteristic of thermal expansion and contraction, the pressure in the pressure pipe applied to the first fluid passage need to be continually increased to help the liquid metal to fill up the multiple micro-chambers, and make the solidified nanoparticles uniform and stable. Therefore, in some embodiments, steps 602a and 602b can be implemented in the same time.

In some embodiments, the mold can include a pair of symmetric mold substrates, such as a first mold substrate and a second mold substrate described above. In this case, the step 603 can include separating the first mold substrate and the second mold substrate, and collecting multiple liquid metal particles in the multiple micro-concaves of the first mold substrate and the second mold substrate. This method has a simple process so that can reduce the product cost.

It should be understood that, the liquid metal particles that just solidified may have high surface energy, and thus an agglomeration phenomena may easily be occurred. On the other hand, since the liquid metal usually has a relatively low melting temperature point, the solidified liquid metal particles may easily convert back to a liquid and lose their rod-like shapes. To solve these problems, a surface-treating agent can be preset on the interior surfaces of the multiple micro-chambers. So that a transparent coating layer can be formed on the surface of each solidified liquid metal particle. It should be understood that, the surface treatment agent can have certain properties that the surface treating agent in a liquid state can mix with molten liquid metal to spontaneously infiltrate the outer surface of the liquid metal. So that during the solidifying process of the liquid metal, a transparent cover layer can be formed on the surface of each metal particle.

As another way of forming a transparent coating layer, the above-described method may further comprise the steps shown in the drawings is not in:

Step 604: stirring the liquid metal particles in a liquid including a dispersant and a surface-treating agent to obtain a transparent coating layer formed on the surfaces of the liquid metal particles.

For example, after being released from the mold, the liquid metal particles can be mixed with BYK161 dispersant and PMA solvent in suitable proportions, and be stirred to disperse in the liquid environment. At the same time, a surface-treating agent can be put into the liquid environment to form a transparent coating layer on the surface of the liquid metal particles.

It should be noted that, the material of the transparent coating layer can be a conductive polymer or an ionic liquid. For example, the material of the transparent coating layer can be poly (3,4-ethylene dioxythiophene)-polystyrene sulfonate, poly styrene (PPV), polypyrrole (PPy), polythiophenes, polysilanes, triphenylmethane, triaryl amines, pyrazoline, or any suitable combinations thereof. As another example, the material of the transparent coating layer can be 1-ethyl-3-methyl-hexafluorophosphate ([emim] PF6),
1-butyl-3-methylimidazolium hexafluorophosphate ([bmim] PF6),
1-octyl-3-methylimidazolium hexafluorophosphate ([omim] PF6),
1-ethyl-3-methylimidazolium tetrafluoroborate ([emim] BF4), 1-butyl-3-methylimidazolium triflate ([bmim] CF3S03), chloride 1-butyl-3-methylimidazolium ([bmim] Cl), or any suitable combinations thereof.

In some embodiments, the disclosed method can further include Step 605 (not shown in the drawings): mixing the liquid metal particles with a base fluid to obtain the liquid metal material. In some embodiments, the base fluid can be mixed with the liquid metal particles during the surface coating process, so Steps 604 and 605 can be implemented in a same process.

Figure 7:
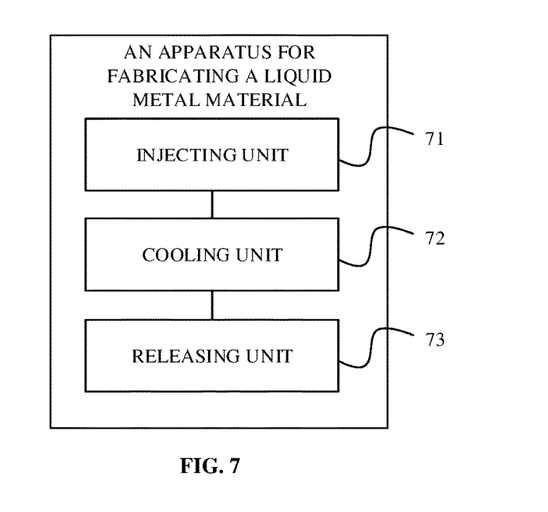
FIG. 7 is an structural block-diagram of an apparatus for fabricating a liquid metal material in accordance with some embodiments of the disclosed subject matter.

According to the method described in FIG. 6, an apparatus for fabricating a liquid metal material can be provided. FIG. 7 shows a structural block-diagram of an exemplary apparatus for fabricating a liquid metal material in accordance with some embodiments of the disclosed subject matter. As illustrated, the apparatus can include injecting unit 71, cooling unit 72, and releasing unit 73.

In some embodiments, injecting unit 71 can be used for injecting a molten liquid metal through a pressure pipe into a first fluid passage of a mold in a vacuum environment. The first fluid passage of the mold can include multiple rod-shaped and nanoscale dimensioned micro-chambers that are interconnected with each other in a sequence, an injection port interconnected with a micro-chamber at the head of the sequence, and one or more discharge ports interconnected with a micro-chamber at the end of the sequence.

In some embodiments, cooling unit 72 can be used for introducing a cooling fluid through a cooling pipe into a second fluid passage of the mold, to solidify the liquid metal into multiple rod-shaped nanoparticles that have crystal structures.

In some embodiments, releasing unit 73 can be used for releasing the multiple nanoparticles from the multiple micro-chambers of the mold, to obtain liquid metal particles.

Injecting unit 71, cooling unit 72, and releasing unit 73 can be installed in a vacuum chamber of a vacuum apparatus. The pressure pipe of injecting unit 71 can be interconnected with the injection port and the one or more discharge ports of the mold. A first pressure control signal terminal for controlling a pressure applied to the first fluid passage from the pressure pipe can be connected with injecting unit 71. A second pressure control signal terminal for controlling a pressure applied to the second fluid passage from the cooling pipe can be connected with cooling unit 72.

In some embodiments, releasing unit 73 can include one or more mechanical arms to perform mechanical operations to release the nanoparticles from the mold. In some embodiments, releasing unit 73 can further include a separating module and a collecting module, which are not shown in the drawings.

The separating module can include a pair of mechanical arms connected to vacuum suction cups. The separating module can be used for separating a first mold substrate and a second mold substrate of the mold. The collecting module can include one or more fine brushes and one or more collecting containers. The collecting module can be used for collecting multiple liquid metal particles in multiple micro-concaves of the first mold substrate and the second mold substrate.

In some embodiments, the disclosed apparatus can include a surface-treating unit, which is not shown in the drawings. The surface-treating unit can preset a surface-treating agent in the interior surfaces of the multiple micro-chambers to form a transparent coating layer on the surfaces multiple liquid metal particles. Alternatively, the disclosed apparatus can include a stirring unit, which is not shown in the drawings. The stirring unit can include a container connected with a conveying pipe, and one or more stirring components within the container. The stirring unit can be used for stirring the liquid metal particles in a liquid including a dispersant and a surface-treating agent to obtain a transparent coating layer formed on the surfaces of the liquid metal particles.

In some embodiments, the disclosed apparatus can further include a mixing unit (not shown in the drawings) for mixing the liquid metal particles with a base fluid to obtain the liquid metal material. The mixing unit can include a weighing component, a mixing tank with one or more stirring components, and one or more fluid pipes. A weighted amount of metal particles and a corresponding quantity of base fluid can be stirred in the mixing tank to obtain a uniform liquid metal material.

Figure 8:
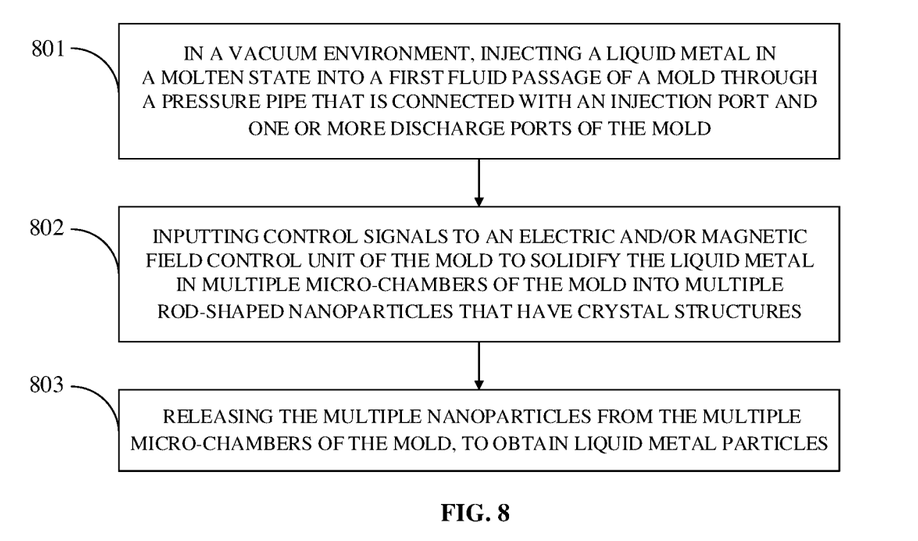
FIG. 8 shows an exemplary method for fabricating a liquid metal material in accordance with some other embodiments of the disclosed subject matter.

Turning to FIG. 8, an exemplary method for fabricating a liquid metal material in accordance with some other embodiments of the disclosed subject matter. Step 801: in vacuum environment, injecting a liquid metal in a molten state into a first fluid passage of a mold through a pressure pipe that is connected with an injection port and one or more discharge ports of the mold.

Step 802: inputting control signals to an electric and/or magnetic field control unit of the mold to solidify the liquid metal in multiple micro-chambers of the mold into multiple rod-shaped nanoparticles that have crystal structures.

Step 803: releasing the multiple nanoparticles from the multiple micro-chambers of the mold, to obtain liquid metal particles.

Comparing to the method described above in connection with FIG. 6, this method uses an electric and/or magnetic field rather than a temperature field to control the solidification process of the liquid metal in multiple micro-chambers of the mold. Under a controlled electric and/or magnetic field, the molten liquid metal can be filled up the multiple micro-chambers of the mold during the solidification process. So that the multiple rod-shaped nanoparticles can be formed uniformly and stability.

In some embodiments, Steps 602a and 602b can also be used here for accelerating the solidification process. For example, a controlled pressure can be applied to the first fluid passage from the pressure pipe and a cooling fluid can be introduced through a cooling pipe into a second fluid passage of the mold for accelerating the solidification process.

In some embodiments, the mold can include a pair of symmetric mold substrate, such as a first mold substrate and a second mold substrate described above. In this case, the step 803 can include separating the first mold substrate and the second mold substrate, and collecting multiple liquid metal particles in the multiple micro-concaves of the first mold substrate and the second mold substrate. This method has a simple process so that can reduce the product cost.

It should be understood that, the liquid metal particles that just solidified may have high surface energy, and thus an agglomeration phenomena may easily be occurred. On the other hand, since the liquid metal usually has a relatively low melting temperature point, the solidified liquid metal particles may easily convert back to a liquid and lose their rod-like shapes. To solve these problems, a surface-treating agent can be preset in the interior surfaces of the multiple micro-chambers. So that a transparent coating layer can be formed on the surface of each solidified liquid metal particle. It should be understood that, the surface treatment agent can have certain properties that the surface treating agent in a liquid state can mix with molten liquid metal to spontaneously infiltrate the outer surface of the liquid metal. So that during the solidifying process of the liquid metal, a transparent cover layer can be formed on the surface of each metal particle.

As another way of forming a transparent coating layer, the above-described method may further comprise the steps shown in the drawings is not in:

Step 804: stirring the liquid metal particles in a liquid including a dispersant and a surface-treating agent to obtain a transparent coating layer formed on the surfaces of the liquid metal particles.

For example, after being released from the mold, the liquid metal particles can be mixed with BYK161 dispersant and PMA solvent in suitable proportions, and be stirred to disperse in the liquid environment. At the same time, a surface-treating agent can be put into the liquid environment to form a transparent coating layer on the surface of the liquid metal particles.

It should be noted that, the material of the transparent coating layer can be a conductive polymer or an ionic liquid. For example, the material of the transparent coating layer can be poly (3,4-ethylene dioxythiophene)-polystyrene sulfonate, poly styrene (PPV), polypyrrole (PPy), polythiophenes, polysilanes, triphenylmethane, triaryl amines, pyrazoline, or any suitable combinations thereof. As another example, the material of the transparent coating layer can be 1-ethyl-3-methyl-hexafluorophosphate ([emim] PF6),
1-butyl-3-methylimidazolium hexafluorophosphate ([bmim] PF6),
1-octyl-3-methylimidazolium hexafluorophosphate ([omim] PF6),
1-ethyl-3-methylimidazolium tetrafluoroborate ([emim] BF4), 1-butyl-3-methylimidazolium triflate ([bmim] CF3S03), chloride 1-butyl-3-methylimidazolium ([bmim] Cl), or any suitable combinations thereof.

In some embodiments, the disclosed method can further include Step 805 (not shown in the drawings): mixing the liquid metal particles with a base fluid to obtain the liquid metal material. In some embodiments, the base fluid can be mixed with the liquid metal particles during the surface coating process, so Steps 804 and 805 can be implemented in a same process.

Figure 9:
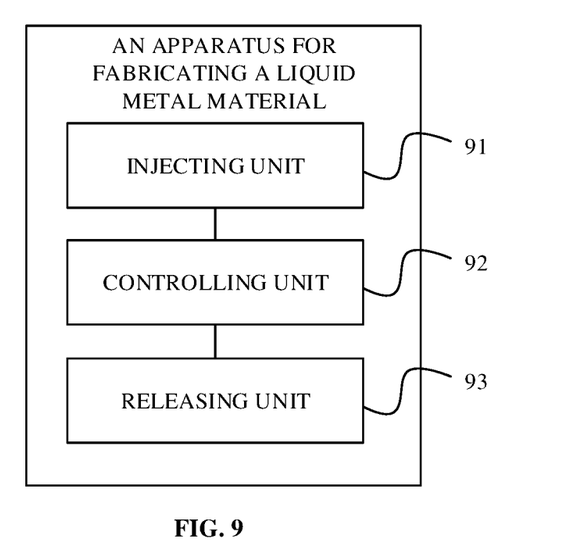
FIG. 9 is an structural block-diagram of an apparatus for fabricating a liquid metal material in accordance with some other embodiments of the disclosed subject matter.

According to the method described in FIG. 8, an apparatus for fabricating a liquid metal material can be provided. FIG. 9 shows an structural block-diagram of an exemplary apparatus for fabricating a liquid metal material in accordance with some embodiments of the disclosed subject matter. As illustrated, the apparatus can include injecting unit 91, controlling unit 92, and releasing unit 93.

In some embodiments, injecting unit 91 can be used for injecting a molten liquid metal through a pressure pipe into a first fluid passage of a mold in a vacuum environment. The first fluid passage of the mold can include multiple rod-shaped and nanoscale dimensioned micro-chambers that are interconnected with each other in a sequence, an injection port interconnected with a micro-chamber at the head of the sequence, and one or more discharge ports interconnected with a micro-chamber at the end of the sequence.

In some embodiments, controlling unit 92 can be used for inputting control signal to an electric and/or magnetic field control unit of the mold to solidify the liquid metal in multiple micro-chambers of the mold into multiple rod-shaped nanoparticles that have crystal structures.

In some embodiments, releasing unit 93 can be used for releasing the multiple nanoparticles from the multiple micro-chambers of the mold, to obtain liquid metal particles.

Injecting unit 91, controlling unit 92, and releasing unit 93 can be installed in a vacuum chamber of a vacuum apparatus. The pressure pipe of injecting unit 91 can be interconnected with the injection port and the one or more discharge ports of the mold. A first pressure control signal terminal for controlling a pressure applied to the first fluid passage from the pressure pipe can be connected with injecting unit 91. Controlling unit 92 can include an electric and/or magnetic field control unit, and a signal generating circuit for generating the control signal for the electric and/or magnetic field control unit.

In some embodiments, releasing unit 93 can include one or more mechanical arms to perform mechanical operations to release the nanoparticles from the mold. In some embodiments, releasing unit 93 can further include a separating module and a collecting module, which are not shown in the drawings.

The separating module can include a pair of mechanical arms connected to vacuum suction cups. The separating module can be used for separating a first mold substrate and a second mold substrate of the mold. The collecting module can include one or more fine brushes and one or more collecting containers. The collecting module can be used for collecting multiple liquid metal particles in multiple microconcaves of the first mold substrate and the second mold substrate.

In some embodiments, the disclosed apparatus can include a surface-treating unit, which is not shown in the drawings. The surface-treating unit can preset a surface-treating agent in the interior surfaces of the multiple microchambers to form a transparent coating layer on the surfaces multiple liquid metal particles. Alternatively, the disclosed apparatus can include a stirring unit, which is not shown in the drawings. The stirring unit can include a container connected with a conveying pipe, and one or more stirring components within the container. The stirring unit can be used for stirring the liquid metal particles in a liquid including a dispersant and a surface-treating agent to obtain a transparent coating layer formed on the surfaces of the liquid metal particles.

In some embodiments, the disclosed apparatus can further include a mixing unit (not shown in the drawings) for mixing the liquid metal particles with a base fluid to obtain the liquid metal material. The mixing unit can include a weighing component, a mixing tank with one or more stirring components, and one or more fluid pipes. A weighted amount of metal particles and a corresponding quantity of base fluid can be stirred in the mixing tank to obtain a uniform liquid metal material.

According to the methods described above in connection with FIGS. 6 and 8, a liquid metal material fabricated by any one of the disclosed method can be provided. The liquid metal material can include a base fluid and liquid metal particles.

The liquid metal particles are crystal nanoparticles formed by a liquid metal. Since each liquid metal particle has a rod-like shape, it is a nanocrystal having a major axis and a minor axis. So the liquid metal particles have similar optical properties of the liquid crystal.

The base fluid is used for providing a fluid environment to disperse the liquid metal particles. The base fluid should have some physical properties that correspond to the physical properties of the liquid metal particles. The base fluid can be selected from any suitable liquid materials that do not chemically react with the liquid metal particles.

Based on the physical properties of the liquid metal, the liquid metal particles in the fluid environment can easily achieve high-speed spin motion under controls of an electric and/or magnetic field, and induce vortex pairs in the surrounding fluid to spin rapidly.

By appropriately setting electrodes and fluid passages in a display device, a movement pattern of the liquid metal particles can be confined to a single-directional quick movement, which can realize a single-directional deflection under controls of the electric and/or magnetic field. So the liquid metal material is an alternative material of the liquid crystal material in a display device.

Further, comparing to the liquid crystal material, the liquid metal material can achieve high-speed movement a relatively weak electric field. Therefore, a display device using the liquid metal material can have many unprecedented excellent characteristics, such as low power consumption, high response speed, and so on.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

It should be noted that the above steps of the flow diagrams of FIGS. 6 and 8 can be executed or performed in any order or sequence not limited to the order and sequence shown and described in the figures. Also, some of the above steps of the flow diagrams of FIGS. 6 and 8 can be executed or performed substantially simultaneously where appropriate or in parallel to reduce latency and processing times. Furthermore, it should be noted that FIGS. 6 and 8 are provided as examples only. At least some of the steps shown in the figures may be performed in a different order than represented, performed concurrently, or altogether omitted. Some additional steps not shown in the figures may be performed between any of the steps shown in the figure.

Accordingly, a display device and a display apparatus, a liquid metal material, related fabricating molds, methods, and apparatus are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A display device, comprising:
   a first substrate;
   a second substrate;
   a liquid metal material layer sandwiched by the first substrate and the second substrate;
   a plurality of first sub-pixel areas on the first substrate; and
   a plurality of second sub-pixel areas on the second substrate,
   wherein the liquid metal material layer comprises:
   a base fluid, and
   a plurality of liquid metal particles which have a melting point lower than room temperature dispersed in the base fluid, and wherein each of the first sub-pixel areas comprises a sub-pixel driving circuit for generating an electromagnetic field to control a rotational orientation of the plurality of liquid metal particles, while remaining dispersed throughout the entirety of the base fluid.

2. The display device of claim 1, wherein:

the plurality of liquid metal particles comprises rod-shaped crystal nanoparticles formed by a liquid metal; and the liquid metal is selected from a group of cesium, gallium, rubidium, potassium, sodium, indium, lithium, tin, bismuth, zinc, antimony, magnesium, aluminum, mercury, and a combination thereof.

3. The display device of claim 1, further comprising:

a first polarizing plate on one side of the first substrate which is opposite to the liquid metal material layer; and a second polarizing plate on one side of the second substrate which is opposite to the liquid metal material;

wherein the first polarizing plate and the second polarizing plate have different polarizing directions.

4. The display device of any one of claim 1, further comprising:

a first aligning layer between the first substrate and the liquid metal material layer; and a second aligning layer between the second substrate and the liquid metal material layer;

wherein the first aligning layer and the second aligning layer are configured for presetting initial rotational orientations of the plurality of liquid metal particles.

* * * * *